United States Patent Office.

REES B. SMITH, OF MOUNT PLEASANT, OHIO.

*Letters Patent No.* 56,818, *dated July* 31, 1866; *reissue No.* 2,575, *dated April* 23, 1867.

IMPROVED COMPOSITION FOR ROOFING AND OTHER PURPOSES.

The Schedule referred to in these Letters Patent and making part of the same.

TO ALL WHOM IT MAY CONCERN:

Be it known that I, REES B. SMITH, of Mount Pleasant, in the county of Jefferson, and State of Ohio, have made a new and useful Composition for Roofing and other Purposes; and I do hereby declare the following to be a full, clear, and exact description of the nature of the same sufficient to enable one skilled in the art to which it is allied to make and compound the same.

The principal ingredients in the compound consist of a mineral found in some abundance in the county of Jefferson and some adjoining counties in the State of Ohio, and which is locally known as Smith's mineral. This substance is ground into fine powder and mixed with coal tar in about the proportions of five parts mineral and two parts tar. From one to fifteen per cent. of carbon oil may be substituted for a portion of the tar, and these proportions may be slightly varied so long as the composition is made to retain such a plastic character as to be readily brushed on to a surface, or spread thereon by a trowel. The mineral which forms the base of the compound is a reddish brown ferruginous earth, of about the weight of an ordinary quality of iron ore, is insoluble in water, fusible at a high heat, and is found by analysis to consist as follows: silica, 37.35; peroxide of iron, 7.50; alumina, 12.70; lime, 4.98; magnesia, 10.31; carbonic acid, 15.25; water, 12.00=100.09, which may be expressed as hydrous silicate of iron and alumina, 69.55; carbonate of lime, 8.98; carbonate of magnesia, 21.65=100.18. This mineral being ground, is mixed with coal tar, and the composition is spread by a brush or trowel in a thin coating upon the surface of the roof, whether the latter consists of shingles, boards, paper, or cloth, and the material affords a water-proof surface of sufficient tenacity to avoid cracking under changes of the temperature. A covering of sand rolled into the plastic material while it is yet moist, makes it more fire-proof, and the composition is useful for topping chimneys, lining cisterns, cementing stone, and also for pavements, when combined with gravel; also for other cementing purposes where a water-proof, plastic, and tenacious composition is useful.

Having described my invention, what I claim therein as new, and desire to secure by Letters Patent, is—

The composition for roofing and other purposes, consisting of the ingredients in about the proportions described.

To the above specification of my improved composition for roofing I have signed my hand this eleventh day of March, 1866.

REES B. SMITH.

Witnesses:

JNO. BURNS,

JOSEPH HARRIS.